Patented Jan. 28, 1936

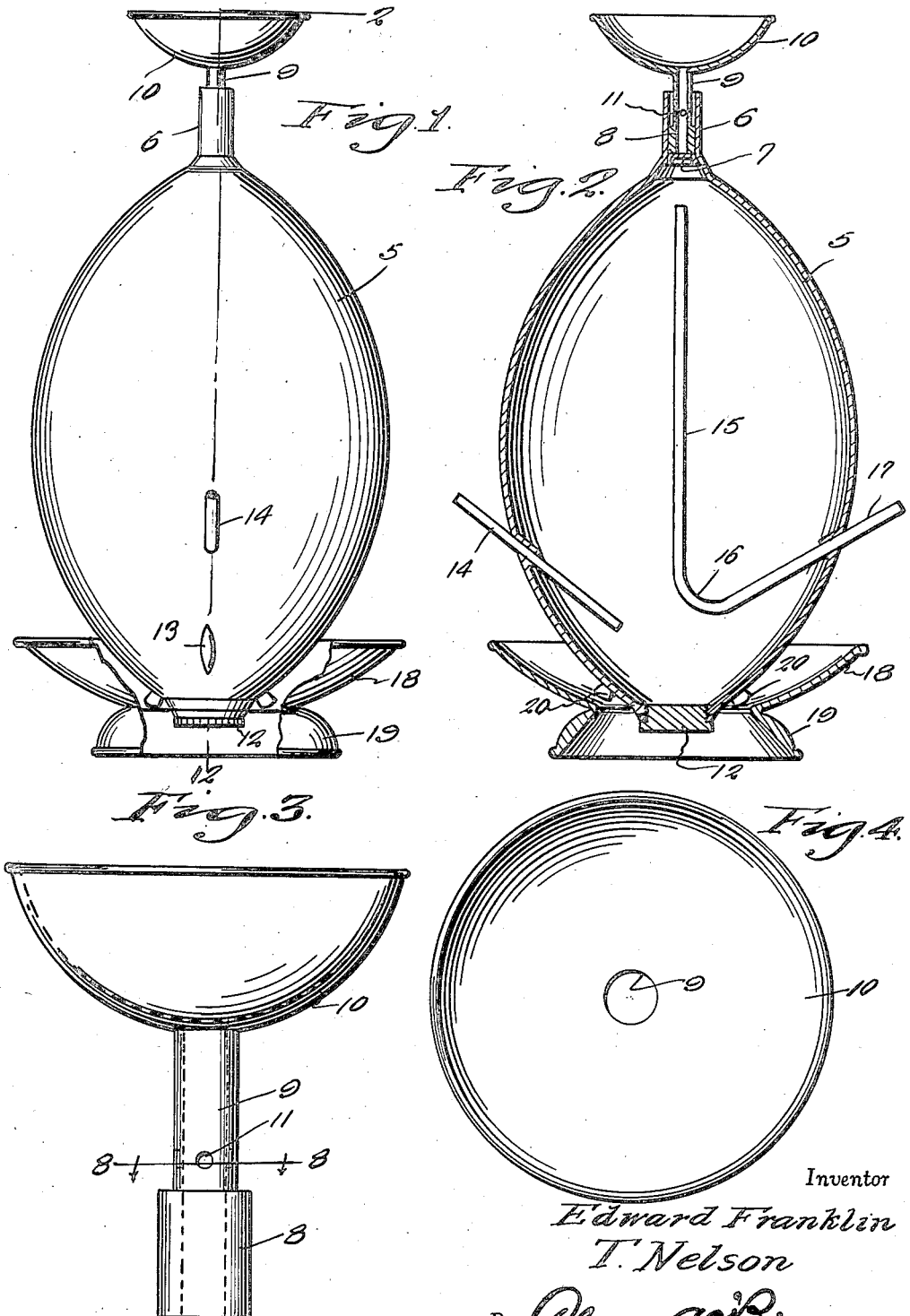

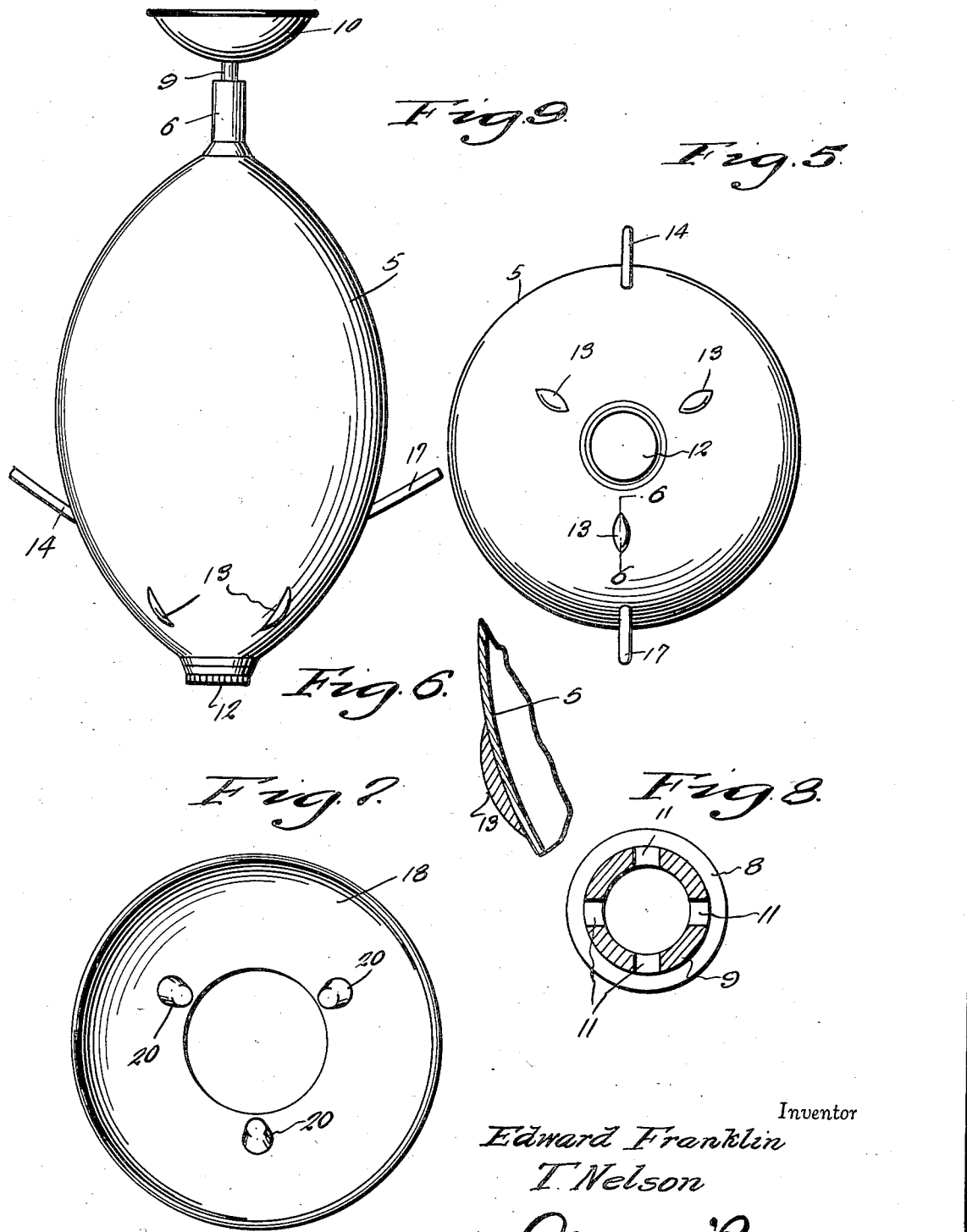

2,029,021

UNITED STATES PATENT OFFICE 2,029,021

CREAM COOLER

Edward Franklin and Thorsten Nelson, Frazee, Minn.

Application March 26, 1935, Serial No. 13,153

2 Claims. (Cl. 31—4)

This invention appertains to new and useful improvements in means for cooling and aerating cream, the same having as its principal object the provision of a device which will permit the distribution of cream in a very fine film over the cooling bowl without the likelihood that any of the same will be lost by splashing or dripping.

Another important object of the invention is to provide an apparatus of the character stated which because of its particular construction can not only be manufactured and sold at low cost, but which is capable of being easily cleaned whenever desired.

These and various other important objects and advantages of the invention will become apparent to the reader of the following specification.

In the drawings:

Figure 1 represents a side elevational view of the device.

Figure 2 represents a vertical sectional view taken substantially on line 2—2 of Figure 1.

Figure 3 represents a side elevational view of the funnel.

Figure 4 represents a top plan view of the funnel.

Figure 5 represents a bottom plan view of the bowl.

Figure 6 represents a fragmentary detailed sectional view taken substantially on line 6—6 of Figure 5.

Figure 7 represents a top plan view of the drip pan.

Figure 8 represents a cross sectional view taken substantially on line 8—8 of Figure 3.

Figure 9 represents a side elevational view of the bowl and the funnel cup.

Referring to the drawings wherein like numerals designate like parts, it can be seen that numeral 5 represents the vertically elongated hollow egg-shaped bowl which is provided with the upstanding neck 6 which is provided with the socket 7 in the bottom thereof and which is adapted to snugly receive the enlarged head portion 8 on the lower end of the tube 9 which depends from the funnel cup 10. The lower end of this head 8 rests upon the plug 7 in the neck 6 while the tube 9 at a point above the head 8 is provided with a plurality of circumferentially spaced openings 11. It can be seen in Figure 2 that a portion of the tube 9 above the head 8 is spaced above the upper portion of the neck 6 so that cream discharging from the funnel tube 9 through the openings 11 will rise in this space between the tube 9 and the neck 6 will flow over the upper edge of the neck 6.

The lower end of the bowl 5 is provided with a clean out plug 12, and when the bowl is used directly on a cream can, elongated cleats 13 on the outside of the bowl adjacent the lower end thereof rest against the neck of the can and obviously space the bowl from the can so that the downwardly travelling film of cream from the bowl will be directed into the receiving can.

Numeral 14 represents the inlet pipe for the cooling agent which is disposed through the wall of the bowl 5 while numeral 15 represents the overflow pipe terminating at its upper end adjacent the upper end of the bowl 5 while the lower portion is bent laterally as at 16 and inclines upwardly and outwardly through the bowl wall 5 as at 17.

Numeral 18 represents the drip pan which is placed on a suitable receiving receptacle for the cooled and aerated cream, the pan 18 being provided with a central opening from which depends the annular apron 19. The pan 18 is provided with internal studs 20 which engage and support the bowl 5 in spaced relation with respect to the pan 18 so that the milk or cream flowing in a film down the outside of the bowl 5 will find a space between the bowl and the pan 18 through which it can flow to reach the receiving receptacle upon which the apron 19 seats.

While the foregoing specification sets forth the invention in specific terms, it is to be understood that numerous changes in the shape, size and materials may be resorted to without departing from the spirit or scope of the invention as claimed hereinafter.

Having thus described the invention, what is claimed is:

1. A cream cooling and aerating device comprising a bowl provided with an upstanding neck, a funnel provided with a depending tube depending into the neck, a closure in the neck for the lower end of the tube, said tube being provided with outlet openings, inlet and outlet means for cooling agents on said bowl, and supporting means for the said bowl, said supporting means comprising a pan having a central opening and provided with upstanding studs for spacing the said bowl from the pan.

2. A cream cooling and aerating device comprising a bowl provided with an upstanding neck, a funnel provided with a depending tube depending into the neck, a closure in the neck for the lower end of the tube, said tube being provided with outlet openings, inlet and outlet means for cooling agents on said bowl, and supporting means for the said bowl, said supporting means comprising a pan having a central opening and provided with upstanding studs for spacing the said bowl from the pan, said pan being provided with a central opening and a depending annular apron at the edge portion of the said opening in the pan.

EDWARD FRANKLIN.
THORSTEN NELSON.